US011185072B2

(12) United States Patent
Bisabri-Ershadi et al.

(10) Patent No.: US 11,185,072 B2
(45) Date of Patent: Nov. 30, 2021

(54) SELECTIVE WEED CONTROL WITH HALAUXIFEN OR 4-AMINO-3-CHLORO-5-FLUORO-6-(4-CHLORO-2-FLUORO-3-METHOXYPHENYL) PYRIDINE-2-CARBOXYLIC ACID OR DERIVATIVES THEREOF IN VINEYARDS OR PERENNIAL CROPS

(71) Applicant: Corteva Agriscience LLC, Indianapolis, IN (US)

(72) Inventors: Barat Bisabri-Ershadi, Orinda, CA (US); Richard K. Mann, Franklin, IN (US); James P. Mueller, Brentwood, CA (US); Deborah G. Shatley, Lincoln, CA (US); Byron B. Sleugh, Clovis, CA (US); Monica Sorribas Amela, Zionsville, IN (US)

(73) Assignee: Corteva Agriscience LLC, Indianapolis, IN (US)

( * ) Notice: Subject to any disclaimer, the term of this patent is extended or adjusted under 35 U.S.C. 154(b) by 0 days.

(21) Appl. No.: 14/566,775

(22) Filed: Dec. 11, 2014

(65) Prior Publication Data
US 2015/0164075 A1 Jun. 18, 2015

Related U.S. Application Data

(60) Provisional application No. 61/915,317, filed on Dec. 12, 2013.

(51) Int. Cl.
*A01N 43/40* (2006.01)
*A01N 25/02* (2006.01)
*A01N 25/08* (2006.01)
*A01N 43/54* (2006.01)
*A01N 57/20* (2006.01)

(52) U.S. Cl.
CPC ............ *A01N 43/40* (2013.01); *A01N 25/02* (2013.01); *A01N 25/08* (2013.01); *A01N 43/54* (2013.01); *A01N 57/20* (2013.01)

(58) Field of Classification Search
CPC ........ A01N 43/40; A01N 57/20; A01N 25/02; A01N 25/08; A01N 43/54
USPC ........................................................ 504/128
See application file for complete search history.

(56) References Cited

U.S. PATENT DOCUMENTS

| 7,314,849 | B2 | 1/2008 | Balko et al. |
| 8,598,084 | B2 | 12/2013 | Satchivi |
| 2008/0051596 | A1 | 2/2008 | Balko et al. |
| 2009/0062121 | A1 | 3/2009 | Satchivi et al. |
| 2010/0137137 | A1 | 6/2010 | Rosinger et al. |
| 2012/0115727 | A1 | 5/2012 | Satchivi et al. |
| 2012/0178627 | A1 | 7/2012 | Richburg et al. |
| 2013/0143738 | A1 | 6/2013 | Ovalle et al. |
| 2013/0143739 | A1 | 6/2013 | Ovalle et al. |
| 2013/0310256 | A1 | 11/2013 | Yerkes et al. |
| 2014/0213446 | A1* | 7/2014 | Yerkes .................. A01N 43/40 504/103 |

FOREIGN PATENT DOCUMENTS

| WO | 2012164013 | 12/2012 |
| WO | PCT/US14/69656 | 12/2014 |

OTHER PUBLICATIONS

Derr, Jeffrey, Weed Control In Vineyards, 2011, Horticultural and Forest Crops 2011, pp. 3-19-3-26.*
USDA, "Using 2,4-D Safely," Farmers Bulletin No. 2005, Nov. 1948.
Mohseni-Moghadam et al., "Response of Wine Grape Cultivars to Simulated Drift Rates of 2,4-D, Dicamba, and Glyphosate, and 2,4-D or Dicamba Plus Glyphosate," Weed Technology, vol. 30, pp. 807-814, 2016.
Bhatti et al., "Wine Grape (*Vitis vinifera*) Response to Fall Exposure of Simulated Drift from Selected Herbicides," Weed Technology, vol. 11, pp. 532-536, 1997.
Ogg et al., "Influence of Repeated Applications of 2,4-D on Yield and Juice Quality of Concord Grapes (*Vitis labruscana*)," Weed Science, vol. 39, pp. 284-295, 1991.
Kadir, S. et al., "Questions and Answers About Vineyard Injury from Herbicide Drift," Oct. 2003, bookstore.ksre.ksu.edu/pubs/MF2588.pdf, downloaded May 26, 2020.
University of Tennessee Institute of Agriculture, "Herbicide Stewardship: Herbicide Damage in Vineyards," publication date unknown but on or after Jun. 15, 2018 (see footnote, p. 48), ag.tennessee.edu/herbicidestewardship/Pages/Herbicide-Damage-in-Vineyards.aspx, downloaded May 26, 2020.
Penn State University Extension, "Herbicide Drift and Drift Related Damage," Aug. 22, 2017, extension.psu.edu/ herbicide-drift-and-drift-related-damage, downloaded Jan. 11, 2019.
Muza, Andy, "Growth Regulator Herbicides and Grapes Don't Mix," Penn State Extension Wine & Grapes U, Oct. 16, 2015, psuwineandgrapes.wordpress.com/2015/10/16/growth-regulator-herbicides-and-grapes-dont-mix, downloaded May 26, 2020.
Kennedy, M. and Skinkis, P., "Are Your Weed-control Products Damaging Nearby Vineyards?," Oregon State University Extension Service, published Jan. 2016, revised Jan. 2020, catalog.extension.oregonstate.edu/em9132, downloaded May 26, 2020.
Kamas, J., "Understanding and Recognizing Synthetic Auxin Damage in Grapes," Texas A&M College of Agriculture and Life Sciences, Apr. 2017, aggie-horticulture.tamu.edu/vitwine/2018/06/02/understanding-and-recognizing-synthetic-auxin-damage-in-grapes/, downloaded May 26, 2020.
Bodelon, B., "Watch Out for: Grapes," Purdue Extension, Purdue University, revised Sep. 2011, extension.purdue.edu/extmedia/ho/dw-10-w.pdf, downloaded May 26, 2020.
Herbicide Resistance Action Committee, "HRAC Mode of Action Classification 2020," 2020, hracglobal.com/tools/ hrac-mode-of-action-classification-2020-map, downloaded May 6, 2020.
Dow Agrosciences, "Arylex™ Active Technical Bulletin," © 2013 Dow AgroSciences LLC, downloaded Mar. 15, 2019.

* cited by examiner

*Primary Examiner* — John Pak
*Assistant Examiner* — Andriae M Holt

(57) ABSTRACT

4-Amino-3-chloro-6-(4-chloro-2-fluoro-3-methoxyphenyl) pyridine-2-carboxylic acid (halauxifen) or 4-amino-3-chloro-5-fluoro-6-(4-chloro-2-fluoro-3-methoxyphenyl) pyridine-2-carboxylic acid or agriculturally acceptable esters or salts of either are used for selective pre-emergence and post-emergence control of undesirable vegetation in the presence of vine crops such as grapes and other perennial crops.

14 Claims, No Drawings

SELECTIVE WEED CONTROL WITH HALAUXIFEN OR 4-AMINO-3-CHLORO-5-FLUORO-6-(4-CHLORO-2-FLUORO-3-METHOXYPHENYL) PYRIDINE-2-CARBOXYLIC ACID OR DERIVATIVES THEREOF IN VINEYARDS OR PERENNIAL CROPS

CROSS REFERENCE TO RELATED APPLICATIONS

This application claims the benefit of U.S. Provisional Patent Application Ser. No. 61/915,317 filed Dec. 12, 2013, the disclosure of which is expressly incorporated herein by reference.

BACKGROUND

Pre-emergence and post-emergence weed control options in conventional vine crops are severely limited, and products that are available generally have narrow weed spectra. There is therefore a need for new pre-emergence and post-emergence herbicides to control undesirable vegetation in vineyards.

Compounds of formula (I)

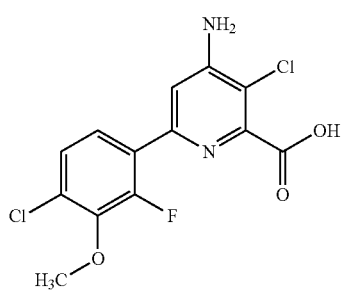

(I)

and agriculturally acceptable salts and esters thereof are described in U.S. Pat. No. 7,314,849 (B2), which is incorporated herein by reference in its entirety. As used herein, the term Compound I is used to refer to the compound of formula (I), i.e. 4-amino-3-chloro-6-(4-chloro-2-fluoro-3-methoxyphenyl)pyridine-2-carboxylic acid, known as halauxifen, and to agriculturally acceptable salts and esters thereof.

Compounds of formula (II)

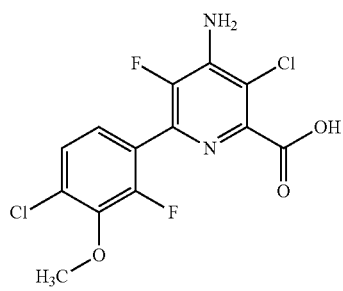

(II)

and agriculturally acceptable salts and esters thereof are described in U.S. Pat. No. 7,314,849 (B2), which is incorporated herein by reference in its entirety. As used herein, the term Compound II is used to refer to the compound of formula (II), i.e. 4-amino-3-chloro-5-fluoro-6-(4-chloro-2-fluoro-3-methoxyphenyl)pyridine-2-carboxylic acid and to agriculturally acceptable salts and esters thereof.

Compounds I and II are described in U.S. Pat. No. 7,314,849 (B2) as belonging to a family of compounds with a broad spectrum of weed control activity against woody plants, broadleaf and grass weeds, and sedges in crops such as corn, rice and cereals. US2009/0062121A1 alleges that Compound I is a preferred compound for the control of weeds in cereal crops including spring, winter and durum wheat, spring and winter barley, oats, and triticale.

U.S. Pat. No. 8,598,084 (B2) states that Compound I is used for the control of weeds in cereal crops, including spring, winter, and *durum* wheat, and spring and winter barley, and that the methyl ester of the compound of formula (I) controls broadleaf weeds such as *Papaver, Galium, Lamium, Kochia, Amaranthus, Aeschynomene, Sesbania,* and *Monochoria*, and sedge species such as *Cyperus* and *Schoenoplectus*.

Vines are particularly sensitive to growth regulator herbicides, such as auxins, if foliar applied. (viticulture-.hort.iastate.edu/info/pdf/herbicideinjury.pdf; extension.oregonstate.edu/gilliam/sites/default/files/Prevent Herbicide I njury Grapes EM8860.pdf; Wine grape (*Vitis vinifera*) response to repeated exposure of selected sulfonamides and 2,4-D. Bhatti et al, Weed Technology 1996, 10, 951-956). In view of the broad spectrum of activity of Compounds I and II against broadleaf weeds, utility of Compounds I and II in vine crops and other perennial crops would not be expected if sprayed directly on the actively growing perennial crops as a foliar application. Compounds I and II applied as directed sprays to the base of the dormant or actively growing vine and other perennial crops with adequate selectivity.

SUMMARY

Provided herein are methods for the selective pre-emergence and post-emergence control of undesirable vegetation in vineyards and other perennial crops which comprises applying a herbicidally effective amount of a compound of formula (I) or formula (II) or an agriculturally acceptable ester or salt of either to the unwanted vegetation or the locus thereof. The compound of formula (I) can be halauxifen (4-amino-3-chloro-6-(4-chloro-2-fluoro-3-methoxyphenyl) pyridine-2-carboxylic acid) or an agriculturally acceptable ester or salt thereof such as, for example, halauxifen-methyl (methyl 4-amino-3-chloro-6-(4-chloro-2-fluoro-3-methoxyphenyl)pyridine-2-carboxylate). The compound of formula (II) can be 4-amino-3-chloro-5-fluoro-6-(4-chloro-2-fluoro-3-methoxyphenyl)pyridine-2-carboxylic acid or agriculturally acceptable ester or salt thereof such as, for example, benzyl 4-amino-3-chloro-5-fluoro-6-(4-chloro-2-fluoro-3-methoxyphenyl)pyridine-2-carboxylate.

DETAILED DESCRIPTION

Definitions

The following terms have the indicated meanings when used herein:

As used herein, a herbicidally effective amount is an amount of active ingredient which causes an adversely modifying effect in targeted vegetation. Such effects include deviations from natural development, killing, regulation, desiccation, retardation, and the like.

As used herein, selective pre- and post-emergence control of undesirable vegetation means preventing, reducing, killing, or otherwise adversely modifying the development of the undesirable vegetation in the presence of crop plants with limited adverse effect on the crop plants. For example, a broadleaf weed control of 80% (rated visually) with crop injury of less than or equal to 20% (rated visually) would constitute selective control. In some embodiments the adverse effect on crop plants is limited to less than 10% visually rated crop injury. Visual crop injury is a composite rating accounting for all phytotoxic effects including chlorosis, necrosis, growth inhibition, epinasty, delays in maturity and seed or fruit deformity. Visual weed control is a composite rating accounting for reductions in pest plant biomass and/or stand reduction.

As used herein, a dormant application means applying Compound I or Compound II during the winter when vines and perennial crops are dormant (no active growth with no foliage in temperate climates) but winter annual weeds are actively growing. A spring application means applying Compound I or Compound II when both vines or perennial crops and weeds are actively growing, typically when new growth starts in the spring in temperate climates or year round in tropical climates. Spring or summer applications, when the vine or perennial crops are growing, is selectively accomplished by a directed spray to the base of the perennial crop.

As used herein, applying a herbicide or herbicidal composition means delivering it directly to the targeted vegetation or to the locus thereof or to the area where control of undesired vegetation is desired, but not directly on the vines. Sprays or granules are directed under the vines or perennial crops, with foliar exposure of the vines and perennial crops being avoided.

As used herein, plants and vegetation include, but are not limited to, germinant seeds, emerging seedlings, plants emerging from vegetative propagules, and established vegetation.

As used herein, agriculturally acceptable salts and esters of the compound of formula (I) or the compound of formula (II) refer to salts and esters that (a) do not substantially affect the herbicidal activity and (b) are or can be hydrolyzed, oxidized, metabolized, or otherwise converted in plants or solid to the corresponding carboxylic acid which, depending upon the pH, may be in the dissociated or undissociated form. Exemplary salts include those derived from alkali or alkaline earth metals and those derived from ammonia and amines. Exemplary cations include sodium, potassium, magnesium, and ammonium cations of the formula:

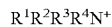

wherein $R^1$, $R^2$, $R^3$ and $R^4$ each, independently represents hydrogen or $C_1$-$C_{12}$ alkyl, $C_3$-$C_{12}$ alkenyl or $C_3$-$C_{12}$ alkynyl, each of which is optionally substituted by one or more hydroxy, $C_1$-$C_4$ alkoxy, $C_1$-$C_4$ alkylthio or phenyl groups, provided that $R^1$, $R^2$, $R^3$ and $R^4$ are sterically compatible. Additionally, any two of $R^1$, $R^2$, $R^3$ and $R^4$ together may represent an aliphatic difunctional moiety containing one to twelve carbon atoms and up to two oxygen or sulfur atoms. Salts can be prepared by treatment with a metal hydroxide, such as sodium hydroxide, with an amine, such as ammonia, trimethylamine, diethanolamine, 2-methylthiopropylamine, bisallylamine, 2-butoxyethylamine, morpholine, cyclodo-decylamine, or benzylamine or with a tetraalkylammonium hydroxide, such as tetramethylammonium hydroxide or choline hydroxide.

Analogs of these compounds in which the acid is derivatized to form a related substituent that can be transformed within plants or the environment to an acid group possess essentially the same herbicidal effect and are within the scope of this disclosure. Therefore, an "agriculturally acceptable derivative", when used to describe the carboxylic acid functionality at the 2-position of the pyridine, is defined as any salt, ester, acylhydrazide, imidate, thioimidate, amidine, amide, orthoester, acylcyanide, acyl halide, thioester, thionoester, dithiolester, nitrile or any other acid derivative well known in the art which (a) does not substantially affect the herbicidal activity of the active ingredient, and (b) is or can be hydrolyzed, oxidized or metabolized in plants or soil to the picolinic acid of formula (I).

Exemplary esters include those derived from $C_1$-$C_{12}$ alkyl, $C_3$-$C_{12}$ alkenyl, $C_3$-$C_{12}$ alkynyl or $C_7$-$C_{10}$ aryl-substituted alkyl alcohols, such as methyl alcohol, isopropyl alcohol, 1-butanol, 2-ethylhexanol, butoxyethanol, methoxypropanol, allyl alcohol, propargyl alcohol, cyclohexanol or unsubstituted or substituted benzyl alcohols. Benzyl alcohols may be substituted with from 1-3 substituents independently selected from halogen, $C_1$-$C_4$ alkyl or $C_1$-$C_4$ alkoxy. Esters can be prepared by coupling of the acids with the alcohol using any number of suitable activating agents such as those used for peptide couplings such as dicyclohexylcarbodiimide (DCC) or carbonyl diimidazole (CDI); by reacting the acids with alkylating agents such as alkylhalides or alkylsulfonates in the presence of a base such as triethylamine or lithium carbonate; by reacting the corresponding acid chloride of an acid with an appropriate alcohol; by reacting the corresponding acid with an appropriate alcohol in the presence of an acid catalyst or by transesterification.

Specific examples of Compound I that were used in carrying out the examples set forth hereinafter are the methyl ester of the compound of formula (I). Specific examples of Compound II that were used in carrying out the examples set forth hereinafter are the benzyl ester of the compound of formula (II).

Herbicidal activity is exhibited by the compounds when they are applied directly to the plant to be controlled or to the locus of the plant to be controlled at any stage of growth. The effect observed depends upon the plant species to be controlled, the stage of growth of the plant, the application parameters of dilution and spray drop size, the particle size of solid components, the environmental conditions at the time of use, the specific compound employed, the specific adjuvants and carriers employed, the soil type, and the like, as well as the amount of chemical applied. These and other factors can be adjusted to promote non-selective or selective herbicidal action. In the present methods, the compositions described herein are applied as a pre-emergence or post-emergence application to non-germinated undesirable vegetation or to relatively immature and mature undesirable vegetation to achieve the maximum control of weeds.

At an application rate of 2.5 to 40 g ae/ha, Compound I as a pre-emergence and post-emergence application is highly efficacious on several commercially relevant broadleaf and grass weeds, including chickweed (*Stellaria media*), pigweed (*Amaranthus* spp.), common lambsquarters (*Chenopodium album*), hairy fleabane (*Conyza bonariensis*), horseweed (*Conyza canadensis*), coast fiddleneck (*Amsinckia intermedia*), Shepherd's purse (*Capsella bursa-pastoris*), rockpurslane (*Calandrinia ciliata*), redstem filaree (*Erodium cicutarium*), smallflower malva (*Malva parviflora*), California burclover (*Medicago polymorpha*), annual bluegrass (*Poa annua*), witchgrass (*Panicum capillare*), quackgrass (*Agropyron repens*), and giant foxtail (*Setaria faberi*). The level of crop safety exhibited by grapevines and perennial crops toward Compound I is variable, but generally post-emergence application rates of ≤20 g ae/ha cause little to no crop injury when applied as a dormant application or a spring application directed under the crops. Additional examples of application rates for Compound I as a pre-emergence and post-emergence application include 0.25 to 50 g ae/ha, 0.25 to 45 g ae/ha, 0.25 to 40 g ae/ha, 0.25 to 35 g ae/ha, 0.25 to 30 g ae/ha, 0.25 to 25 g ae/ha, 0.25 to 20 g ae/ha, 0.25 to 15 g ae/ha, 0.25 to 10 g ae/ha, 0.25 to 5 g ae/ha, 2.5 to 50 g ae/ha, 5 to 50 g ae/ha, 10 to 50 g ae/ha, 15 to 50 g ae/ha, 20 to 50 g ae/ha, 25 to 50 g ae/ha, 30 to 50 g ae/ha, 35 to 50 g ae/ha, 40 to 50 g ae/ha, 45 to 50 g ae/ha, 5 to 40 g ae/ha, 10 to 40 g ae/ha, 15 to 40 g ae/ha, 20 to 40 g ae/ha, 25 to 40 g ae/ha, 30 to 40 g ae/ha, 35 to 40 g ae/ha, 2.5 to 35 g ae/ha, 2.5 to 30 g ae/ha, 2.5 to 25 g ae/ha, 2.5 to 20 g ae/ha, 2.5 to 15 g ae/ha, 2.5 to 10 g ae/ha, 2.5 to 5 g ae/ha, 5 to 35 g ae/ha, 10 to 30 g ae/ha, 15 to 25 g ae/ha, and 15 to 20 g ae/ha. Further examples of application rates for Compound I as a pre-emergence and post-emergence application include 0.25 g ae/ha, 0.5 g ae/ha, 0.75 g ae/ha, 1 g ae/ha, 1.25 g ae/ha, 1.5 g ae/ha, 1.75 g ae/ha, 2 g ae/ha, 2.25 g ae/ha, 2.5 g ae/ha, 3 g ae/ha, 4 g ae/ha, 5 g ae/ha, 6 g ae/ha, 7 g ae/ha, 8 g ae/ha, 9 g ae/ha, 10 g ae/ha, 12 g ae/ha, 14 g ae/ha, 16 g ae/ha, 18 g ae/ha, 20 g ae/ha, 22 g ae/ha, 24 g ae/ha, 26 g ae/ha, 28 g ae/ha, 30 g ae/ha, 32 g ae/ha, 34 g ae/ha, 36 g ae/ha, 38 g ae/ha, 40 g ae/ha, 42 g ae/ha, 44 g ae/ha, 46 g ae/ha, 48 g ae/ha, and 50 g ae/ha.

At an application rate of 2.5 to 50 g ai/ha, Compound II as a pre-emergence or post-emergence application is highly efficacious on several commercially relevant broadleaf and grass weeds, including chickweed (*Stellaria media*), pigweed (*Amaranthus* spp.), common lambsquarters (*Chenopodium album*), hairy fleabane (*Conyza bonariensis*), horseweed (*Conyza canadensis*), coast fiddleneck (*Amsinckia intermedia*), Shepherd's purse (*Capsella bursa-pastoris*), rock purslane (*Calandrinia ciliata*), redstem filaree (*Erodium cicutarium*), smallflower malva (*Malva parviflora*), morningglory (*Ipomoea* spp.), and California burclover (*Medicago polymorpha*). The level of crop safety exhibited by grapevines and perennial crops toward Compound II is variable, but generally post-emergence application rates of ≤20 g ae/ha cause little to no crop injury when applied as a dormant application or as a spring application directed under the crops. Additional examples of application rates for Compound II as a pre-emergence and post-emergence application include 1 to 100 g ai/ha, 1 to 90 g ai/ha, 1 to 80 g ai/ha, 1 to 70 g ai/ha, 1 to 60 g ai/ha, 1 to 50 g ai/ha, 1 to 45 g ai/ha, 1 to 40 g ai/ha, 1 to 35 g ai/ha, 1 to 30 g ai/ha, 1 to 25 g ai/ha, 1 to 20 g ai/ha, 1 to 15 g ai/ha, 1 to 10 g ai/ha, 1 to 5 g ai/ha, 5 to 100 g ai/ha, 10 to 100 g ai/ha, 15 to 100 g ai/ha, 20 to 100 g ai/ha, 25 to 100 g ai/ha, 30 to 100 g ai/ha, 35 to 100 g ai/ha, 40 to 100 g ai/ha, 45 to 100 g ai/ha, 50 to 100 g ai/ha, 60 to 100 g ai/ha, 70 to 100 g ai/ha, 80 to 100 g ai/ha, 90 to 100 g ai/ha, 5 to 50 g ai/ha, 10 to 50 g ai/ha, 15 to 50 g ai/ha, 20 to 50 g ai/ha, 25 to 50 g ai/ha, 30 to 50 g ai/ha, 35 to 50 g ai/ha, 40 to 50 g ai/ha, 45 to 50 g ai/ha, 2.5 to 45 g ai/ha, 2.5 to 40 g ai/ha, 2.5 to 35 g ai/ha, 2.5 to 30 g ai/ha, 2.5 to 25 g ai/ha, 2.5 to 20 g ai/ha, 2.5 to 15 g ai/ha, 2.5 to 10 g ai/ha, 2.5 to 5 g ai/ha, 5 to 45 g ai/ha, 10 to 40 g ai/ha, 15 to 35 g ai/ha, and 20 to 30 g ai/ha. Further examples of application rates for Compound II as a pre-emergence and post-emergence application include 1 g ai/ha, 1.25 g ai/ha, 1.5 g ai/ha, 1.75 g ai/ha, 2 g ai/ha, 2.25 g ai/ha, 2.5 g ai/ha, 3 g ai/ha, 4 g ai/ha, 5 g ai/ha, 6 g ai/ha, 7 g ai/ha, 8 g ai/ha, 9 g ai/ha, 10 g ai/ha, 12 g ai/ha, 14 g ai/ha, 16 g ai/ha, 18 g ai/ha, 20 g ai/ha, 22 g ai/ha, 24 g ai/ha, 26 g ai/ha, 28 g ai/ha, 30 g ai/ha, 32 g ai/ha, 34 g ai/ha, 36 g ai/ha, 38 g ai/ha, 40 g ai/ha, 42 g ai/ha, 44 g ai/ha, 46 g ai/ha, 48 g ai/ha, 50 g ai/ha, 60 g ai/ha, 70 g ai/ha, 80 g ai/ha, 90 g ai/ha.

The mixtures described herein can be applied in conjunction with one or more other herbicides to control a wider variety of undesirable vegetation. When used in conjunction with other herbicides, the composition can be formulated with the other herbicide or herbicides, tank mixed with the other herbicide or herbicides, or applied sequentially with the other herbicide or herbicides. Some of the herbicides that can be employed in conjunction with the compositions and methods described herein include, but are not limited to: 4-CPA, 4-CPB, 4-CPP, 2,4-D, 2,4-D choline salt, 2,4-D esters and amines, 2,4-DB, 3,4-DA, 3,4-DB, 2,4-DEB, 2,4-DEP, 3,4-DP, 2,3,6-TBA, 2,4,5-T, 2,4,5-TB, acetochlor, acifluorfen, aclonifen, acrolein, alachlor, allidochlor, alloxydim, allyl alcohol, alorac, ametridione, ametryn, amibuzin, amicarbazone, amidosulfuron, aminocyclopyrachlor, aminopyralid, amiprofos-methyl, amitrole, ammonium sulfamate, anilofos, anisuron, asulam, atraton, atrazine, azafenidin, azimsulfuron, aziprotryne, barban, BCPC, beflubutamid, benazolin, bencarbazone, benfluralin, benfuresate, bensulfuron-methyl, bensulide, benthiocarb, bentazon-sodium, benzadox, benzfendizone, benzipram, benzobicyclon, benzofenap, benzofluor, benzoylprop, benzthiazuron, bialaphos, bicyclopyrone, bifenox, bilanafos, bispyribac-sodium, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, cambendichlor, carbasulam, carbetamide, carboxazole, carfentrazone-ethyl, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlomitrofen, chloropon, chlorotoluron, chloroxuron, chloroxynil, chlorprocarb, chlorpropham, chlorsulfuron, chlorthal, chlorthiamid, cinidon-ethyl, cinmethylin, cinosulfuron, cisanilide, clethodim, cliodinate, clodinafop-propargyl, clofop, clomazone, clomeprop, cloprop, cloproxydim, clopyralid, cloransulam-methyl, CMA, copper sulfate, CPMF, CPPC, credazine, cresol, cumyluron, cyanatryn, cyanazine, cycloate, cyclopyrimorate, cyclosulfamuron, cycloxydim, cycluron, cyhalofop-butyl, cyperquat, cyprazine, cyprazole, cypromid, daimuron, dalapon, dazomet, delachlor, desmedipham, desmetryn, di-allate, dicamba, dichlobenil, dichloralurea, dichlormate, dichlorprop, dichlorprop-P, diclofop-methyl, diclosulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinofenate, dinoprop, dinosam, dinoseb, dinoterb, diphenamid, dipropetryn, diquat, disul, dithiopyr, diuron, DMPA, DNOC, DSMA, EBEP, eglinazine, endothal, epronaz, EPTC, erbon, esprocarb, ethalfluralin, ethbenzamide, ethametsulfuron, ethidimuron, ethiolate, ethobenzamid, etobenzamid, ethofumesate, ethoxyfen, ethoxysulfuron, etinofen, etnipromid, etobenzanid, EXD, fenasulam, fenoprop, fenoxaprop, fenoxaprop-P-ethyl, fenoxaprop-P-ethyl+isoxadifen-ethyl, fenoxasulfone, fenquinotrione, fenteracol, fenthiaprop, fentrazamide, fenuron, ferrous sulfate, flamprop, flamprop- M, flazasulfuron, florasulam, fluazifop, fluazifop-P-butyl, fluazolate, flucarbazone, flucetosulfuron, fluchloralin, flufenacet, flufenican, flufenpyr-ethyl, flumetsulam, flumezin, flumiclorac-pentyl, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, flurochloridone, fluroxypyr, fluroxypyr-meptyl, flurtamone, fluthiacet, fomesafen, foramsulfuron, fosamine, fumiclorac, furyloxyfen, glufosinate, glufosinate-ammonium, glufosinate-P-ammonium, glyphosate, halosafen, halosulfuron-methyl, haloxydine, haloxyfop-methyl, haloxyfop-P-methyl, hexachloroacetone, hexaflurate, hexazinone, imazamethabenz, imazamox, imazapic, imazapyr, imazaquin, imazosulfuron, imazethapyr, indanofan, indaziflam, iodobonil, iodomethane, iodosulfuron, iodosulfuron-ethyl-sodium, iofensulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MAA, MAMA, MCPA esters and amines, MCPA-thioethyl, MCPB, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiozolin, methiuron, methometon, methoprotryne, methyl bromide, methyl isothiocyanate, methyldymron, metobenzuron, metobromuron, metolachlor, metosulam, metoxuron, metribuzin, metsulfuron, metsulfuron-methyl, molinate, monalide, monisouron, monochloroacetic acid, monolinuron, monuron, morfamquat, MSMA, naproanilide, napropamide, napropamide-M, naptalam, neburon, nicosulfuron, nipyraclofen, nitralin, nitrofen, nitrofluorfen, norflurazon, noruron, OCH, orbencarb, ortho-dichlorobenzene, orthosulfamuron, oryzalin, oxadiargyl, oxadiazon, oxapyrazon, oxasulfuron, oxaziclomefone, oxyfluorfen, paraflufen-ethyl, parafluron, paraquat, pebulate, pelargonic acid, pendimethalin, penoxsulam, pentachlorophenol, pentanochlor, pentoxazone, perfluidone, pethoxamid, phenisopham, phenmedipham, phenmedipham-ethyl, phenobenzuron, phenylmercury acetate, picloram, picolinafen, pinoxaden, piperophos, potassium arsenite, potassium azide, potassium cyanate, pretilachlor, primisulfuron-methyl, procyazine, prodiamine, profluazol, profluralin, profoxydim, proglinazine, prohexadione-calcium, prometon, prometryn, pronamide, propachlor, propanil, propaquizafop, propazine, propham, propisochlor, propoxycarbazone, propyrisulfuron, propyzamide, prosulfalin, prosulfocarb, prosulfuron, proxan, prynachlor, pydanon, pyraclonil, pyraflufen-ethyl, pyrasulfotole, pyrazogyl, pyrazolynate, pyrazosulfuron-ethyl, pyrazoxyfen, pyribenzoxim, pyributicarb, pyriclor, pyridafol, pyridate, pyriftalid, pyriminobac, pyrimisulfan, pyrithiobac-sodium, pyroxasulfone, pyroxsulam, quinclorac, quinmerac, quinoclamine, quinonamid, quizalofop, quizalofop-P-ethyl, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfometuron, sulfosate, sulfosulfuron, sulfuric acid, sulglycapin, swep, TCA, tebutam, tebuthiuron, tefuryltrione, tembotrione, tepraloxydim, terbacil, terbucarb, terbuchlor, terbumeton, terbuthylazine, terbutryn, tetrafluron, thenylchlor, thiazafluron, thiazopyr, thidiazimin, thidiazuron, thiencarbazone-methyl, thifensulfuron, thifensulfuron-methyl, thiobencarb, tiocarbazil, tioclorim, topramezone, tralkoxydim, triafamone, tri-allate, triasulfuron, triaziflam, tribenuron, tribenuron-methyl, tricamba, triclopyr choline salt, triclopyr esters and salts, tridiphane, trietazine, trifloxysulfuron, trifluralin, triflusulfuron, trifop, trifopsime, trihydroxytriazine, trimeturon, tripropindan, tritac, tritosulfuron, vernolate, xylachlor and salts, esters, optically active isomers and mixtures thereof. Particularly preferred mixing partners include glyphosate salts and esters, glufosinate-ammonium, paraquat, oxyfluorfen, penoxsulam, flumioxazin, fluroxypyr, clopyralid, flazasulfuron, pendimethalin, isoxaben, indaziflam and saflufenacil.

The compositions and methods described herein can further be used in conjunction with glyphosate, glufosinate, dicamba, phenoxy auxins, pyridyloxy auxins, aryloxyphenoxypropionates, acetyl CoA carboxylase (ACCase) inhibitors, imidazolinones, acetolactate synthase (ALS) inhibitors, 4-hydroxyphenyl-pyruvate dioxygenase (HPPD) inhibitors, protoporphyrinogen oxidase (PPO) inhibitors, triazines, and bromoxynil on glyphosate-tolerant, glufosinate-tolerant, dicamba-tolerant, phenoxy auxin-tolerant, pyridyloxy auxin-tolerant, aryloxyphenoxypropionate-tolerant, ACCase-tolerant, imidazolinone-tolerant, ALS-tolerant, HPPD-tolerant, PPO-tolerant, triazine-tolerant, bromoxynil-tolerant, and crops possessing multiple or stacked traits conferring tolerance to multiple chemistries and/or multiple modes-of-action. In some embodiments, the compound of formula (I) or formula (II) or salts or esters thereof and a complementary herbicide or salt or ester thereof are used in combination with herbicides that are selective for the crop being treated and which complement the spectrum of weeds controlled by these compounds at the application rate employed. In some embodiments, the compositions described herein and other complementary herbicides are applied at the same time, either as a combination formulation or as a tank mix.

The compounds of formula I or formula II or agriculturally acceptable salts or esters thereof may be used to control herbicide resistant or tolerant weeds. The methods employing the combination of a compound of formula I or formula II or agriculturally acceptable salt or ester thereof and the compositions described herein may also be employed to control herbicide resistant or tolerant weeds. Exemplary resistant or tolerant weeds include, but are not limited to, biotypes resistant or tolerant to acetolactate synthase (ALS) or acetohydroxy acid synthase (AHAS) inhibitors (e.g., imidazolinones, sulfonylureas, pyrimidinylthiobenzoates, triazolopyrimidines, sulfonylaminocarbonyltriazolinones); photosystem II inhibitors (e.g., phenylcarbamates, pyridazinones, triazines, triazinones, uracils, amides, ureas, benzothiadiazinones, nitriles, phenylpyridazines); acetyl CoA carboxylase (ACCase) inhibitors (e.g., aryloxyphenoxypropionates, cyclohexanediones, phenylpyrazolines); synthetic auxins (e.g., benzoic acids, phenoxycarboxylic acids, pyridine carboxylic acids, quinoline carboxylic acids); auxin transport inhibitors (e.g., phthalamates, semicarbazones); photosystem I inhibitors (e.g., bipyridyliums); 5-enolpyruvylshikimate-3-phosphate (EPSP) synthase inhibitors (e.g., glyphosate); glutamine synthetase inhibitors (e.g., glufosinate, bialafos); microtubule assembly inhibitors (e.g., benzamides, benzoic acids, dinitroanilines, phosphoramidates, pyridines); mitosis inhibitors (e.g., carbamates); very long chain fatty acid (VLCFA) inhibitors (e.g., acetamides, chloroacetamides, oxyacetamides, tetrazolinones); fatty acid and lipid synthesis inhibitors (e.g., phosphorodithioates, thiocarbamates, benzofuranes, chlorocarbonic acids); protoporphyrinogen oxidase (PPO) inhibitors (e.g., diphenylethers, N-phenylphthalimides, oxadiazoles, oxazolidinediones, phenylpyrazoles, pyrimidindiones, thiadiazoles, triazolinones); carotenoid biosynthesis inhibitors (e.g., clomazone, amitrole, aclonifen); phytoene desaturase (PDS) inhibitors (e.g., amides, anilidex, furanones, phenoxybutan-amides, pyridiazinones, pyridines); 4-hydroxyphenyl-pyruvate-dioxygenase (HPPD) inhibitors (e.g., callistemones, isoxazoles, pyrazoles, triketones); cellulose biosynthesis inhibitors (e.g., nitriles, benzamides, quinclorac, triazolocarboxamides); herbicides with multiple modes-of-action such as quinclorac; and unclassified herbicides such as arylaminopropionic acids, difenzoquat, endothall, and organoarsenicals. Exemplary resistant or tolerant weeds include, but are not limited to, biotypes with resistance or tolerance to single or multiple herbicides, biotypes with resistance or tolerance to single or multiple chemical classes, biotypes with resistance or tolerance to single or multiple herbicide modes-of-action, and biotypes with multiple resistance or tolerance mechanisms (e.g., target site resistance or metabolic resistance).

In some embodiments, the methods provided herein are utilized to control undesirable vegetation found in vine crops and other perennial crops, including, but not limited to, grapevines and tree and fruit orchards, including, but not limited to, almond, apple, apricot, avocado, beechnut, Brazil nut, butternut, cashew, cherry, chestnut, chinquapin, citrus, crab apple, date, feijoa, fig, grapefruit, filbert, hickory nut, kiwi, lemon, lime, loquat, macadamia nut, mandarin, mayhaws, nectarine, olives, oranges (sweet and sour), peach, pear, pecan, persimmon, pistachio, plum, pome fruit, pomegranates, prune, quince, stone fruit, tangerine, tangelo, tree nuts and walnut, and perennial plantation crops including, but not limited to, rubber, oil palm, coffee and cacao. In certain embodiments, the undesirable vegetation is *Agropyren repens* L. (quackgrass, AGRRE), *Alopecurus myosuroides* Huds. (blackgrass, ALOMY), *Avena fatua* L. (wild oat, AVEFA), *Brachiaria decumbens* Stapf. or *Urochloa decumbens* (Stapf) R. D. Webster (Surinam grass, BRADC), *Brachiaria brizantha* (Hochst. ex A. Rich.) Stapf. or *Urochloa brizantha* (Hochst. ex A. Rich.) R. D. (beard grass, BRABR), *Brachiaria platyphylla* (Groseb.) Nash or *Urochloa platyphylla* (Nash) R. D. Webster (broadleaf signalgrass, BRAPP), *Brachiaria plantaginea* (Link) Hitchc. or *Urochloa plantaginea* (Link) R. D. Webster (alexandergrass, BRAPL), *Cenchrus echinatus* L. (southern sandbur, CENEC), *Digitaria horizontalis* Willd. (Jamaican crabgrass, DIGHO), *Digitaria insularis* (L.) Mez ex Ekman (sourgrass, TRCIN), *Digitaria sanguinalis* (L.) Scop. (large crabgrass, DIGSA), *Echinochloa crus-galli* (L.) P. Beauv. (barnyardgrass, ECHCG), *Echinochloa colonum* (L.) Link (junglerice, ECHCO), *Eleusine indica* (L.) Gaertn. (goosegrass, ELEIN), *Lolium multiflorum* Lam. (Italian ryegrass, LOLMU), *Panicum capillare* (witchgrass, PANCA), *Panicum dichotomiflorum* Michx. (fall *panicum*, PANDI), *Panicum miliaceum* L. (wild-proso millet, PANMI), *Poa annua* L. (annual bluegrass, POAAN), *Setaria faberi* Herrm. (giant foxtail, SETFA), *Setaria viridis* (L.) Beauv. (green foxtail, SETVI), *Sorghum halepense* (L.) Pers. (Johnsongrass, SORHA), *Sorghum bicolor* (L.) Moench ssp. *Arundinaceum* (shattercane, SORVU), *Cyperus esculentus* L. (yellow nutsedge, CYPES), *Cyperus rotundus* L. (purple nutsedge, CYPRO), *Abutilon theophrasti* Medik. (velvetleaf, ABUTH), *Amaranthus* species (pigweeds and amaranths, AMASS), *Ambrosia artemisiifolia* L. (common ragweed, AMBEL), *Ambrosia psilostachya* DC. (western ragweed, AMBPS), *Ambrosia trifida* L. (giant ragweed, AMBTR), *Amsinckia intermedia* L. (coast fiddleneck, AMSIN), *Anoda cristata* (L.) Schlecht. (spurred *anoda*, ANVCR), *Asclepias syriaca* L. (common milkweed, ASCSY), *Bidens pilosa* L. (hairy beggarticks, BIDPI), *Borreria* species (BOISS), *Borreria alata* (Aubl.) DC. or *Spermacoce alata* Aubl. or *Spermacoce latifolia* (broadleaf buttonweed, BOILF), *Capsella bursa-pastoris* L. (Shepherd's purse, CAPBP), *Chenopodium album* L. (common lambsquarters, CHEAL), *Cirsium arvense* (L.) Scop. (Canada thistle, CIRAR), *Calandrinia ciliata* L. (rock purslane, CLNCM), *Commelina benghalensis* L. (tropical spiderwort, COMBE), *Datura stramonium* L. (jimsonweed, DATST), *Daucus carota* L. (wild carrot, DAUCA), *Euphorbia heterophylla* L. (wild poinsettia, EPHHL), *Euphorbia hirta* L. or *Chamaesyce hirta* (L.) Millsp. (garden spurge, EPHHI), *Euphorbia dentata* Michx. (toothed spurge, EPHDE), *Erigeron bonariensis* L. or *Conyza bonariensis* (L.) Cronq. (hairy fleabane, ERIBO), *Erigeron canadensis* L. or *Conyza canadensis* (L.) Cronq. (horseweed, ERICA), *Conyza sumatrensis* (Retz.) E. H. Walker (tall fleabane, ERIFL), *Erodium cicutarium* L. (redstem filaree, EROCI), *Helianthus annuus* L. (common sunflower, HELAN), *Jacquemontia tamnifolia* (L.) Griseb. (smallflower morningglory, IAQTA), *Ipomoea hederacea* (L.) Jacq. (ivyleaf morningglory, IPOHE), *Ipomoea lacunosa* L. (white morningglory, IPOLA), *Ipomoea* species (morningglory, IPOSS), *Lactuca serriola* L./Torn. (prickly lettuce, LACSE), *Malva parviflora* L. (smallflower malva, MALPA), *Medicago polymorpha* L. (California burclover, MEDPO), *Portulaca oleracea* L. (common purslane, POROL), *Richardia* species (pusley, RCHSS), *Sida* species (*sida*, SIDSS), *Sida spinosa* L. (prickly *sida*, SIDSP), *Sinapis arvensis* L. (wild mustard, SINAR), *Sonchus arvensis* L. (perennial sowthistle, SONAR), *Solanum ptychanthum* Dunal (eastern black nightshade, SOLPT), *Stellaria media* L. (common chickweed, STEME), *Taraxacum officinale* G. H. Weber ex Wiggers (dandelion, TAROF), *Tridax procumbens* L. (coat buttons, TRQPR), and *Xanthium strumarium* L. (common cocklebur, XANST).

In some embodiments, the compositions described herein are employed in combination with one or more herbicide safeners, such as AD-67 (MON 4660), benoxacor, benthiocarb, brassinolide, cloquintocet (mexyl), cyometrinil, daimuron, dichlormid, dicyclonon, dimepiperate, disulfoton, fenchlorazole-ethyl, fenclorim, flurazole, fluxofenim, furilazole, harpin proteins, isoxadifen-ethyl, jiecaowan, jiecaoxi, mefenpyr-diethyl, mephenate, naphthalic anhydride (NA), oxabetrinil, R29148 and N-phenyl-sulfonylbenzoic acid amides, 1-[4-(N-(2-methoxybenzoyl)sulfamoyl)phenyl]-3-methylurea, N-(2-methoxybenzoyl)-4-[(methylaminocarbonyl)amino]benzenesulfonamide, to enhance their selectivity. In some embodiments, the safener is cloquintocet or an ester or salt thereof. In certain embodiments, cloquintocet is utilized to antagonize harmful effects of the compositions, particularly in rice and cereals. In some embodiments, the safener is cloquintocet (mexyl).

In some embodiments, compositions provided herein further comprise at least one agriculturally acceptable adjuvant or carrier. Suitable adjuvants or carriers should not be phytotoxic to valuable crops, particularly at the concentrations employed in applying the compositions for selective weed control in the presence of crops, and should not react chemically with herbicidal components or other composition ingredients. Such mixtures can be designed for application directly to weeds or their locus or can be concentrates or formulations that are normally diluted with additional carriers and adjuvants before application. They can be solids, such as, for example, dusts, granules, water-dispersible granules, or wettable powders, or liquids, such as, for example, emulsifiable concentrates, solutions, emulsions or suspensions. They can also be provided as a pre-mix or tank mixed.

Suitable agricultural adjuvants and carriers include, but are not limited to, crop oil concentrate; nonylphenol ethoxylate; benzylcocoalkyldimethyl quaternary ammonium salt; blend of petroleum hydrocarbon, alkyl esters, organic acid, and anionic surfactant; $C_9$-$C_{11}$ alkylpolyglycoside; phosphated alcohol ethoxylate; natural primary alcohol ($C_{12}$-$C_{16}$) ethoxylate; di-sec-butylphenol EO-PO block copolymer; polysiloxane-methyl cap; nonylphenol ethoxylate+urea ammonium nitrate; emulsified methylated seed oil; tridecyl alcohol (synthetic) ethoxylate (8EO); tallow amine ethoxylate (15 EO); PEG (400) dioleate-99; paraffinic oil, alkoxylated alcohol non-ionic surfactant; mineral oil, surfactant blend.

Liquid carriers that can be employed include water and organic solvents. The organic solvents include, but are not limited to, petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like. Specific organic solvents include, but are not limited to toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methyl alcohol, ethyl alcohol, isopropyl alcohol, amyl alcohol, ethylene glycol, propylene glycol, glycerine, N-methyl-2-pyrrolidinone, N,N-dimethyl alkylamides, dimethyl sulfoxide, liquid fertilizers and the like. In certain embodiments, water is the carrier for the dilution of concentrates.

Suitable solid carriers include but are not limited to talc, pyro-phyllite clay, silica, attapulgus clay, kaolin clay, kieselguhr, chalk, diatomaceous earth, lime, calcium carbonate, bentonite clay, Fuller's earth, cottonseed hulls, wheat flour, soybean flour, pumice, wood flour, walnut shell flour, lignin, cellulose, and the like.

In some embodiments, the compositions described herein further comprise one or more surface-active agents. In some embodiments, such surface-active agents are employed in both solid and liquid compositions, and in certain embodiments those designed to be diluted with carrier before application. The surface-active agents can be anionic, cationic or nonionic in character and can be employed as emulsifying agents, wetting agents, suspending agents, or for other purposes. Surfactants which may also be used in the present formulations are described, inter alia, in *McCutcheon's Detergents and Emulsifiers Annual*, M C Publishing Corporation: Ridgewood, N.J., 1998 and in Encyclopedia of Surfactants, Vol. I-III, Chemical Publishing Company: New York, 1980-81. Surface-active agents include, but are not limited to salts of alkyl sulfates, such as diethanolammonium lauryl sulfate; alkylarylsulfonate salts, such as calcium dodecylbenzenesulfonate; alkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkyl-naphthalene-sulfonate salts, such as sodium dibutylnaphthalenesulfonate; dialkyl esters of sulfosuccinate salts, such as sodium di(2-ethylhexyl) sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, and in certain embodiments, methyl esters.

In some embodiments, these materials, such as vegetable or seed oils and their esters, can be used interchangeably as an agricultural adjuvant, as a liquid carrier or as a surface active agent.

Other exemplary additives for use in the compositions provided herein include but are not limited to compatibilizing agents, antifoam agents, sequestering agents, neutralizing agents and buffers, corrosion inhibitors, dyes, odorants, spreading agents, penetration aids, sticking agents, dispersing agents, thickening agents, freezing point depressants, antimicrobial agents, and the like. The compositions may also contain other compatible components, for example, other herbicides, plant growth regulants, fungicides, insecticides, and the like and can be formulated with liquid fertilizers or solid, particulate fertilizer carriers such as ammonium nitrate, urea and the like.

In some embodiments, the concentration of the active ingredients in the compositions described herein is from 0.0005 to 98 percent by weight. In some embodiments, the concentration is from 0.0006 to 90 percent by weight. In compositions designed to be employed as concentrates, the active ingredients, in certain embodiments, are present in a concentration from 0.1 to 98 weight percent, and in certain embodiments 0.5 to 90 weight percent. Such compositions are, in certain embodiments, diluted with an inert carrier, such as water, before application. The diluted compositions usually applied to weeds or the locus of weeds contain, in certain embodiments, 0.0006 to 15.0 weight percent active ingredient and in certain embodiments contain 0.01 to 7.0 weight percent.

The present compositions can be applied to weeds or their locus by the use of conventional ground or aerial dusters, sprayers, and granule applicators, by addition to irrigation water, and by other conventional means known to those skilled in the art. Vines are particularly sensitive to growth regulator herbicides, such as the auxins, if foliar applied.

(viticulture.hortiastate.edu/info/pdf/herbicideinjury.pdf; extension.oregonstate.edu/gilliam/sites/default/files/Prevent Herbicide I njury Grapes EM8860.pdf; Wine grape (*Vitis vinifera*) response to repeated exposure of selected sulfonamides and 2,4-D. Bhatti et al., Weed Technology 1996, 10, 951-956.

The described embodiments and following examples are for illustrative purposes and are not intended to limit the scope of the claims. Other modifications, uses, or combinations with respect to the compositions described herein will be apparent to a person of ordinary skill in the art without departing from the spirit and scope of the claimed subject matter.

EXAMPLES

Field Trials

Small plot research experiments were conducted in Fresno, Calif., USA to evaluate the pre-emergence and post-emergence herbicidal weed control activity and the vines crop tolerance to pre-emergence and post-emergence application of Compound I and Compound II to the weeds. Application water volume of 100 to 187 liters per hectare (L/ha) was used for all experiments. All treatments were applied with a standard small plot carbon dioxide ($CO_2$) backpack sprayer. All treatments were tank-mixed with Crop Oil Concentrate (COC), a well known adjuvant, at 2.34 L/ha. Experimental emulsifiable concentrate (EC) formulations were used for Compounds I and II. The dimethylammonium (DMA) salt of glyphosate was used in all trials. Pindar® GT is a commercial formulation containing a pre-mix of penoxsulam+oxyfluorfen (10+476 grams of active ingredient per liter (g ai/L), respectively). Vine crop stage was dormant (no leaves on the vines during the winter) or early spring growth at the time of Compound I or Compound II application. Generally, weeds were not emerged for the pre-emergence treatments or were at the two to six-leaf stage at the time of the post-emergence herbicide application.

Tables 1, 2 and 6 provide weed control results from pre-emergence applications of Compounds I and/or II prior to weed emergence; Tables 4, 7 and 8 provide weed control results from post-emergence applications of Compounds I and/or II applied to actively growing weeds; Tables 3 and 5 provide vine response data from pre-emergence and post-emergence applications of Compound I respectively.

TABLE 1

Percent visual weed control at 90 Days After Application (DAA) of Halauxifen-methyl ester (I-Me) when applied prior to Weed Emergence as a Dormant Application (December) in California vineyards.

| Compound | Rate | Unit | HORMU | | CAPBP | | ERICA | | MALPA | | EROCI | | POAAN | |
|---|---|---|---|---|---|---|---|---|---|---|---|---|---|---|
| | | | % Visual Control 90 DAA | | | | | | | | | | | |
| I-Me | 10 | g ae/ha | 100 | a | 62 | b | 75 | a | 85 | a | 58 | d | 58 | b |
| I-Me | 20 | g ae/ha | 100 | a | 58 | b | 100 | a | 88 | a | 72 | c | 65 | b |
| I-Me | 40 | g ae/ha | 100 | a | 82 | ab | 100 | a | 89 | a | 82 | b | 63 | b |
| PINDAR® GT | 1,698 | g ai/ha | 100 | a | 100 | a | 100 | a | 100 | a | 100 | a | 100 | a |
| Untreated | | | 0 | b | 0 | c | 0 | b | 0 | b | 0 | e | 0 | c |
| LSD (P = 0.05) | | | 0 | | 23.12 | | 26.29 | | 17.57 | | 8.99 | | 21.88 | |

Means followed by same letter do not signficantly differ (P = 0.05, Student-Newman-Keuls)

TABLE 2

Percent visual weed control at 184 Days After Application (DAA) of Halauxifen-methyl ester (I-Me) when applied prior to weed emergence as a Dormant Application (December) in California vineyards.

| | Rate | Unit | HORMU | | ERICA | | MALPA | | EROCI | | POAAN | | PANCA | |
|---|---|---|---|---|---|---|---|---|---|---|---|---|---|---|
| | | | % Visual Control 184 DAA | | | | | | | | | | | |
| I-Me | 10 | g ae/ha | 90 | a | 92 | a | 45 | b | 47 | a | 48 | ab | 60 | ab |
| I-Me | 20 | g ae/ha | 88 | a | 97 | a | 60 | b | 52 | a | 28 | b | 33.3 | ab |
| I-Me | 40 | g ae/ha | 92 | a | 100 | a | 47 | b | 55 | a | 47 | ab | 63.3 | ab |
| PINDAR® GT | 1,698 | g ai/ha | 98 | a | 100 | a | 96 | a | 73 | a | 100 | a | 97 | a |
| Untreated | | | 0 | b | 0 | b | 0 | c | 0 | b | 0 | b | 0 | b |
| LSD (P = 0.05) | | | 16.19 | | 11.91 | | 21.02 | | 19.93 | | 49.1 | | 56.57 | |

Means followed by same letter do not significanty differ (P = 0.05, Student-Newman-Keuls)

TABLE 3

Percent visual vine injury and growth response at 124, 184 and 236 Days After Application (DAA) from Halauxifen-methyl ester (I-Me) applied to the soil as a Dormant Application (December) in California vineyards.

| | | | VITSS | | | | | | | | |
|---|---|---|---|---|---|---|---|---|---|---|---|
| Compound | Rate | Unit | % Visual Injury 124 DAA | | % Visual Injury 184 DAA | | Branch Length (cm) 184 DAA | | Internode Length (cm) 184 DAA | | Yield (Lbs) 236 DAA | |
| I-Me | 10 | g ae/ha | 0 | a | 15 | a | 187 | a | 7 | a | 71 | a |
| I-Me | 20 | g ae/ha | 0 | a | 18 | a | 172 | ab | 7 | a | 63 | a |
| I-Me | 40 | g ae/ha | 0 | a | 37 | a | 125 | ab | 6 | b | 31 | a |
| PINDAR ® GT | 1,698 | g ai/ha | 0 | a | 18 | a | 126 | ab | 5 | b | 69 | a |
| Untreated | | | 0 | a | 0 | a | 112 | b | 5 | b | 34 | a |
| LSD (P = 0.05) | | | 0 | | 22.6 | | 45.4 | | 1.2 | | 75.2 | |

Means followed by same letter do not significantly differ (P = 0.05, Student-Newman-Keuls)

TABLE 4

Percent visual weed control at 60 Days After Application (DAA) of Halauxifen-methyl ester (I-Me) when applied as a Post-Emergence Directed Spring Application (April) in California vineyards.

| | | | % Visual Control 60 DAA | | | | | | | | | | |
|---|---|---|---|---|---|---|---|---|---|---|---|---|---|
| Compound | Rate | Unit | ERIBO | | MALPA | | EROCI | | PANCA | | AGRRE | | SETFA | |
| Untreated | | | 0 | b | 0 | c | 0 | c | 0 | b | 0 | b | 4 | b |
| I-Me | 5 | g ae/ha | 97 | a | 75 | a | 62 | ab | 82 | a | 87 | a | 98 | a |
| I-Me | 10 | g ae/ha | 95 | a | 72 | a | 70 | ab | 88 | a | 80 | a | 80 | a |
| I-Me | 20 | g ae/ha | 93 | a | 73 | a | 86 | a | 86 | a | 83 | a | 97 | a |
| Penoxsulam | 35 | g ai/ha | 85 | a | 85 | a | 87 | a | 85 | a | 87 | a | 97 | a |
| LSD (P = 0.05) | | | 20.4 | | 13.4 | | 19.0 | | 19.4 | | 18.6 | | 22.2 | |

Means comparisons performed only when AOV Treatment P(F) is significant at mean comparison OSL.

TABLE 5

Vine response when rated at 60 Days After Application (DAA) of Halauxifen-methyl ester (I-Me) applied as a Post-Emergence Directed Spring Application (April) in California vineyards.

| | | | VITSS 60 DAA | | | |
|---|---|---|---|---|---|---|
| Compound | Rate | Unit | Vine Length (cm) | | Node Count | |
| Untreated | | | 122 | a | 22 | a |
| I-Me | 5 | g ae/ha | 114 | a | 23 | a |
| I-Me | 10 | g ae/ha | 88 | a | 19 | a |
| I-Me | 20 | g ae/ha | 91 | a | 20 | a |
| Penoxsulam | 35 | g ai/ha | 89 | a | 20 | a |
| LSD (P = 0.05) | | | 26.3 | | 3.7 | |

Means followed by same letter do not significantly differ (P = 0.05, Student-Newman-Keuls)

TABLE 6

Percent visual weed control at 48 Days After Application (DAA) following Halauxifen-methyl ester (I-Me) and Compound II benzyl ester (II-Bn) applied as a Pre-Emergence Application (February) in California vineyards.

| | | | % Visual Control 48 DAA | | | | | |
|---|---|---|---|---|---|---|---|---|
| Compound | Rate | Unit | AMSIN | | CAPBP | | CLNCM | |
| Untreated | | | 0 | d | 0 | e | 0 | d |
| Glyphosate | 1680 | g ae/ha | 0 | d | 0 | e | 0 | d |
| I-Me | 2.5 | g ae/ha | 25 | c | 50 | d | 27.6 | c |
| I-Me | 5 | g ae/ha | 43.3 | b | 76.7 | b | 43.3 | bc |
| I-Me | 10 | g ae/ha | 36.7 | bc | 90 | e | 86.7 | a |
| II-Bn | 5 | g ai/ha | 0 | d | 0 | e | 0 | d |
| II-Bn | 10 | g ai/ha | 33.3 | bc | 60 | c | 40 | bc |
| II-Bn | 20 | g ai/ha | 40 | b | 76.7 | b | 56.7 | bc |
| II-Bn | 40 | g ai/ha | 87.3 | a | 100 | a | 90 | a |
| II-Bn | 50 | g ai/ha | 84.3 | a | 96.7 | a | 96.7 | a |
| PINDAR ® GT | 1700 | g ai/ha | 100 | a | 100 | a | 100 | a |
| LSD (P = .05) | | | 10.93 | | 9.38 | | 17.49 | |

Means followed by same letter do not significantly differ (P = 0.05, Student-Newman-Keuls)

TABLE 7

Percent visual weed control at 59 Days After Application (DAA) of Halauxifen-methyl ester (I-Me) and Compound II benzyl ester (II-Bn) applied as a Post-Emergence Directed Spring Application (March) in California vineyards.

| Compound | Rate | Unit | % Visual Control 59 DAA | | | | | | | |
|---|---|---|---|---|---|---|---|---|---|---|
| | | | MEDPO | | MALPA | | EROCI | | STEME | |
| Untreated | | | 0 | b | 0 | c | 0 | c | 0 | c |
| Glyphosate | 1680 | g ae/ha | 100 | a | 86.7 | ab | 91 | a | 93.3 | a |
| I-Me | 2.5 | g ae/ha | 100 | a | 80 | ab | 43.3 | b | 46.7 | b |
| I-Me | 5 | g ae/ha | 100 | a | 90 | ab | 89.7 | a | 94 | a |
| I-Me | 10 | g ae/ha | 100 | a | 96.7 | ab | 94 | a | 95.7 | a |
| II-Bn | 5 | g ai/ha | 100 | a | 61.9 | b | 81.7 | a | 70 | a |
| II-Bn | 10 | g ai/ha | 100 | a | 83.4 | ab | 85 | a | 75 | a |
| II-Bn | 20 | g ai/ha | 100 | a | 90 | ab | 85 | a | 84.3 | a |
| II-Bn | 40 | g ai/ha | 100 | a | 95 | ab | 94.3 | a | 94.3 | a |
| II-Bn | 50 | g ai/ha | 100 | a | 96.7 | ab | 96 | a | 97.3 | a |
| PINDAR ® GT | 1700 | g ai/ha | 100 | a | 95 | ab | 92.7 | a | 96.7 | a |
| LSD (P = .05) | | | 8.49 | | 20.45 | | 19.24 | | 20.97 | |

Means followed by same letter do not significantly differ (P = 0.05, Student-Newman-Keuls)

TABLE 8

Percent visual weed control at 57 Days After Application (DAA) of Halauxifen-methyl ester (I-Me) and Compound II benzyl ester (II-Bn) applied as a Post-Emergence Directed Dormant Application (December) in California vineyards.

| Compound | Rate | Unit | % Visual Control 57 DAA | | | | | | | | | |
|---|---|---|---|---|---|---|---|---|---|---|---|---|
| | | | AMSIN | | CAPBP | | CHEAL | | AMARE | | IPOSS | |
| Untreated | | | 0 | c | 0 | c | 0 | b | 0 | b | 0 | b |
| Glyphosate | 1680 | g ae/ha | 100 | a | 99.3 | a | 95 | a | 0 | b | 51.7 | ab |
| I-Me | 2.5 | g ae/ha | 38.3 | b | 91.7 | a | 100 | a | 95 | a | 57.8 | ab |
| I-Me | 5 | g ae/ha | 76.7 | a | 99.3 | a | 96.7 | a | 96.7 | a | 65 | ab |
| I-Me | 10 | g ae/ha | 97.3 | a | 100 | a | 100 | a | 100 | a | 66.7 | ab |
| II-Bn | 5 | g ai/ha | 56.7 | ab | 100 | a | 96.7 | a | 100 | a | 55 | ab |
| II-Bn | 10 | g ai/ha | 96.7 | a | 100 | a | 100 | a | 95 | a | 46.7 | ab |
| II-Bn | 20 | g ai/ha | 86.7 | a | 100 | a | 100 | a | 100 | a | 66.7 | ab |
| II-Bn | 40 | g ai/ha | 100 | a | 100 | a | 100 | a | 100 | a | 66.7 | ab |
| II-Bn | 50 | g ai/ha | 100 | a | 100 | a | 100 | a | 100 | a | 97.3 | a |
| PINDAR ® GT | 1700 | g ai/ha | 100 | a | 100 | a | 93.3 | a | 100 | a | 100 | a |
| LSD (P = .05) | | | 26.37 | | 16.86 | | 33.95 | | 5.34 | | 52.7 | |

Means followed by same letter do not significantly differ (P = 0.05, Student-Newman-Keuls)
AGRRE = *Agropyron repens* (quackgrass)
AMARE = *Amaranthus retroflexus* (redroot pigweed)
AMSIN = *Amsinckia intermedia* (coast fiddleneck)
CAPBP = *Capsella bursa pastoris* (Shepherd's purse)
CHEAL = *Chenopodium album* (common lambsquarters)
CLNCM = *Calandrinia ciliata* (rock purslane)
ERIBO = *Conyza bonariensis* (hairy fleabane)
ERICA = *Conyza canadensis* (horseweed)
EROCI = *Erodium cicutarium* (redstem filaree)
HORMU = *Hordeum murinum* (wall barley)
IPOSS = *Ipomoea* spp (morningglory)
MALPA = *Malva parviflora* (smallflower malva)
MEDPO = *Medicago polymorpha* (California burclover)
PANCA = *Panicum capillare* (witchgrass)
POAAN = *Poa annua* (annual bluegrass)
SETFA = *Setaria faberi* (giant foxtail)
STEME = *Stellaria media* (common chickweed)
VITSS = *Vitis* spp (grape)
g ae/ha = grams of acid equivalent/hectare
g ai/ha = grams of active ingredient/hectare
DAA = Days After Application
cm = centimeters
lbs = pounds The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative composition materials and method steps disclosed herein are specifically described, other combinations of the composition materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

What is claimed is:

1. A method for the selective pre-emergence and post-emergence control of undesirable vegetation in grape vineyards which comprises applying a herbicidally effective amount of halauxifen (4-amino-3-chloro-6-(4-chloro-2-fluoro-3-methoxyphenyl)pyridine-2-carboxylic acid) or 4-amino-3-chloro-5-fluoro-6-(4-chloro-2-fluoro-3-methoxyphenyl)-pyridine-2-carboxylic acid or an agriculturally acceptable ester or salt of either directly to the undesirable vegetation or the locus thereof or to the area where control of the undesirable vegetation is desired but not directly on a grapevine, wherein the halauxifen herbicide or an agriculturally acceptable ester or salt thereof is applied at a rate of 2 to 35 g ae/ha, or wherein the 4-amino-3-chloro-5-fluoro-6-(4-chloro-2-fluoro-3-methoxyphenyl)-pyridine-2-carboxylic acid herbicide or an agriculturally acceptable ester or salt thereof is applied at a rate of 5 to 50 g ai/ha.

2. The method of claim 1 wherein the herbicide is halauxifen (4-amino-3-chloro-6-(4-chloro-2-fluoro-3-methoxyphenyl)pyridine-2-carboxylic acid) or an agriculturally acceptable ester or salt thereof.

3. The method of claim 2 wherein the halauxifen herbicide is halauxifen-methyl (methyl 4-amino-3-chloro-6-(4-chloro-2-fluoro-3-methoxyphenyl)pyridine-2-carboxylate).

4. The method of claim 2 wherein the halauxifen herbicide is applied at a rate of 2.5 to 35 g ae/ha.

5. The method of claim 3 wherein the halauxifen-methyl is applied at a rate of 2.5 to 20 g ae/ha.

6. The method of claim 1 wherein the herbicide is 4-amino-3-chloro-5-fluoro-6-(4-chloro-2-fluoro-3-methoxyphenyl)pyridine-2-carboxylic acid or an agriculturally acceptable ester or salt thereof.

7. The method of claim 6 wherein the herbicide is benzyl 4-amino-3-chloro-5-fluoro-6-(4-chloro-2-fluoro-3-methoxyphenyl)pyridine-2-carboxylate.

8. The method of claim 1 wherein halauxifen or 4-amino-3-chloro-5-fluoro-6-(4-chloro-2-fluoro-3-methoxyphenyl)pyridine-2-carboxylic acid or an agriculturally acceptable ester or salt of either is applied pre-emergence to the undesirable vegetation.

9. The method of claim 1 wherein halauxifen or 4-amino-3-chloro-5-fluoro-6-(4-chloro-2-fluoro-3-methoxyphenyl)pyridine-2-carboxylic acid or an agriculturally acceptable ester or salt of either is applied post-emergence to the undesirable vegetation.

10. The method of claim 1 wherein the undesirable vegetation includes chickweed (*Stellaria media*), pigweed (*Amaranthus* spp.), common lambsquarters (*Chenopodium album*), hairy fleabane (*Conyza bonariensis*), horseweed (*Conyza canadensis*), coast fiddleneck (*Amsinckia intermedia*), Shepherd's purse (Capsella bursa-pastoris), rock purslane (*Calandrinia ciliata*), redstem filaree (*Erodium cicutarium*), wall barley (*Hordeum murinam*), morningglory (*Ipomoea* spp), smallflower malva (*Malva parviflora*), California burclover (*Medicago polymorpha*), annual bluegrass (*Poa annua*), witchgrass (*Panicum capillare*), quackgrass (*Agropyron repens*) or giant foxtail (*Setaria faberi*).

11. The method of claim 1 wherein the herbicidally effective amount of halauxifen or 4-amino-3-chloro-5-fluoro-6-(4-chloro-2-fluoro-3-methoxyphenyl)pyridine-2-carboxylic acid or an agriculturally acceptable ester or salt of either, is applied in a dormant application when grapevines are dormant but winter annual weeds are actively growing.

12. The method of claim 1 wherein the herbicidally effective amount of halauxifen or 4-amino-3-chloro-5-fluoro-6-(4-chloro-2-fluoro-3-methoxyphenyl)pyridine-2-carboxylic acid or an agriculturally acceptable ester or salt of either is applied in a spring or summer application when both grapevines and weeds are actively growing.

13. The method of claim 1 wherein the herbicidally effective amount of halauxifen or 4-amino-3-chloro-5-fluoro-6-(4-chloro-2-fluoro-3-methoxyphenyl)pyridine-2-carboxylic acid or an agriculturally acceptable ester or salt of either is applied in a dormant application when grapevines are dormant but winter annual weeds have not germinated.

14. The method of claim 1 wherein the herbicidally effective amount of halauxifen or 4-amino-3-chloro-5-fluoro-6-(4-chloro-2-fluoro-3-methoxyphenyl)pyridine-2-carboxylic acid or an agriculturally acceptable ester or salt of either is applied under the grapevines as a directed spray to the base of the grapevine, with foliar exposure of the grapevines being avoided.

* * * * *